(12) United States Patent
Durski et al.

(10) Patent No.: US 12,052,243 B2
(45) Date of Patent: Jul. 30, 2024

(54) PERSONALIZED SECURITY SYSTEM

(71) Applicant: Verum Securitas, Inc., Concord, CA (US)

(72) Inventors: Kris Durski, Moraga, CA (US); Gustav Metkowski, Concord, CA (US)

(73) Assignee: Verum Securitas, Inc., Concord, CA (US)

( * ) Notice: Subject to any disclaimer, the term of this patent is extended or adjusted under 35 U.S.C. 154(b) by 87 days.

(21) Appl. No.: 17/954,598

(22) Filed: Sep. 28, 2022

(65) Prior Publication Data

US 2023/0020847 A1 Jan. 19, 2023

Related U.S. Application Data

(63) Continuation of application No. 16/910,573, filed on Jun. 24, 2020, now Pat. No. 11,503,022, which is a continuation of application No. 15/987,325, filed on May 23, 2018, now Pat. No. 10,701,070.

(51) Int. Cl.
 *H04L 29/06* (2006.01)
 *H04L 9/08* (2006.01)
 *H04L 9/40* (2022.01)

(52) U.S. Cl.
 CPC ........ *H04L 63/0869* (2013.01); *H04L 9/0825* (2013.01); *H04L 63/0428* (2013.01); *H04L 63/083* (2013.01); *H04L 63/166* (2013.01)

(58) Field of Classification Search
 CPC ... H04L 63/0869; H04L 63/20; H04L 63/083; H04L 63/166; H04L 9/0825; H04L 63/0428
 USPC ...................................................... 713/169
 See application file for complete search history.

(56) References Cited

U.S. PATENT DOCUMENTS

| | | | |
|---|---|---|---|
| 8,407,474 B2 | 3/2013 | Pan | |
| 8,511,548 B1* | 8/2013 | Mori | G06K 19/06206 235/379 |
| 9,515,999 B2 | 12/2016 | Ylonen | |
| 9,577,996 B2* | 2/2017 | Heinrich | H04L 9/0863 |
| 2014/0230043 A1* | 8/2014 | Schneider | H04L 63/0884 726/12 |
| 2020/0329038 A1 | 10/2020 | Durski | |

OTHER PUBLICATIONS

Durski, U.S. Appl. No. 16/910,573, filed Jun. 24, 2020, Notice of Allowance and Fees Due, Jul. 13, 2022.
Durski, U.S. Appl. No. 15/987,325, filed May 23, 2018, Notice of Allowance, Mar. 27, 2020.

* cited by examiner

*Primary Examiner* — Longbit Chai
(74) *Attorney, Agent, or Firm* — Patterson + Sheridan, LLP (57) ABSTRACT

A method for providing improved personalized security mechanisms for transferring electronic data is disclosed. In an embodiment, the method comprises generating, at a client computer, a user key pair, wherein the user key pair comprises a user private key and a user public key; transmitting the user public key from the client computer to a server computer; receiving, at the client computer, from the server computer, a user account public key; generating a virtual memory stick ("VMS") file and including, in the VMS file, one or more keys and one or more passphrases; encrypting the VMS file with a protection passphrase to generate an encrypted VMS file; and transmitting the encrypted VMS file to the server computer.

20 Claims, 9 Drawing Sheets

PERSONALIZED SECURITY SYSTEM

BENEFIT CLAIM

This application claims the benefit under 35 U.S.C. § 120 as a Continuation of application Ser. No. 16/910,573, filed Jun. 24, 2020; which is a Continuation of application Ser. No. 15/987,325, filed May 23, 2018, now U.S. Pat. No. 10,701,070 issued Jun. 30, 2020; the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

One technical field of the present disclosure is computer network security. Another technical field is personalized security in data communications.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Cybercrime has been increasing at a rapid pace. Damages caused by cybercrime reached about $3 trillion in 2017, and the World Economic Forum estimates that cybercrime damages may reach about $6 trillion in 2021. Even though spending on global cybersecurity is expected to balloon to about $100 billion by 2020, the frequency of cyberattacks continues to increase and severity of the attacks is astounding.

Integrity of sensitive data, ranging from medical records to personal financial information, may be easily compromised because existing security mechanisms are often inefficient and unreliable. In fact, most of the existing approaches for securing electronic data are unable to keep up with the rapid development of sophisticated cyberattacks.

Traditional security systems are based on verification, or authentication, of user credentials, and encryption and decryption of transmitted data. The encryption and decryption may be implemented in compliance with encryption protocol such as the Secure Sockets Layer/Transport Layer Security ("SSL/TLS") Protocol, the Secure Shell ("SSH") Protocol, and others.

Encryption protocols, however, have many limitations. For example, they operate under the assumption that integrity of data is sufficiently preserved when a server only authenticates credentials of a user to release and encrypt the data. After the authentication, but prior to delivering data to the user or a system, the data is anonymously encrypted on the server side and then anonymously decrypted on a client side. However, this type of authentication only verifies the user's credentials, not the user himself. Therefore, this type of authentication cannot detect whether the user's credentials were provided by a legitimate user or by an imposter who stole the credentials from the legitimate user. This type of authentication has no mechanisms for detecting situations when the credentials have been intercepted and used by the imposter.

One solution to the problem includes implementing the SSL/TLS or SSH authentication on both ends of a data communications pipeline, as it has been done in a Pretty Good Privacy ("PGP") protocol. However, that approach has an inherent problem with the quality of encryption. If the encryption is based on human created passphrases, then the encryption mechanisms may be quite weak. If the encryption is based on X.509, then the encryption mechanisms are limited by an X.509 certificate, which is typically associated with a device. Since a digital X.509 certificate, which includes an identity of a device, uses the widely accepted, international X.509 public key infrastructure ("PKI") standard to verify whether a public key is valid, the certificate authenticates the device, not the user. Hence, even if a certificate is implemented on both ends of the data communications pipeline, it certificates that a particular device can communicate with a server, but it does not authenticate the actual user. Moreover, if the particular device is lost, stolen or hacked, the security measures based on that certificate collapse entirely.

Generally, current authentication methods are deficient and remain susceptible to unauthorized access and abuse. The SSL was developed by Netscape™ for use in securing the HTTP that is an application protocol for distributed, collaborative, and hypermedia information systems. For example, when a browser accesses a URL which begins with "https", the browser uses the HTTP over an SSL connection.

The TLS is the name of the Internet Engineering Task Force ("IETF") protocol standard that grew out of the SSL 3.0, and is documented by RFC 2246. The TLS has goals and features similar to those of the SSH Transport and User Authentication protocols. It provides a single, full-duplex byte stream to clients, with cryptographically assured privacy and integrity, and optional authentication. However, the TLS differs from the SSH in several ways. For example, in the TLS, a server authentication is optional. Thus, the protocol can support fully anonymous operation, in which neither side is authenticated. Such connections are inherently vulnerable to man-in-the-middle attacks.

In the SSH-TRANS, a server authentication is mandatory, and the mandatory authentication protects against man-in-the-middle attacks. It is possible for a client to skip the step of verifying that the public key supplied by the server actually belongs to the entity that the client intended to contact. However, unless the client explicitly skips the authentication, the SSH-TRANS can withstand the man-in-the-middle attacks.

According to another example, X.509 certificates may be used in the TLS. The implementations may be a bit more cumbersome than in the SSH because the X.509 certificates require implementing a PKI and managing the X.509 certificates is more complicated than managing the SSH keys. For example, the TLS does not provide the same range of user authentication options than the SSH. Furthermore, the TLS does not have certain features that are available in the SSH, such as the SSH Connection Protocol ("SSH-CONN"). The SSH-CONN uses the underlying SSH-TRANS connection to provide a multiple logical data channels to an application, as well as support for a remote program execution, terminal management, tunneled TCP connections, and flow control.

DETAILED DESCRIPTION

In the following description, for the purposes of explanation, numerous specific details are set forth in order to provide a thorough understanding of the methods described herein. It will be apparent, however, that the present approach may be practiced without these specific details. In some instances, well-known structures and devices are shown in a block diagram form to avoid unnecessarily obscuring the present approach.

1. Overview

In an embodiment, an approach is presented for a personal security system for communicating, transferring and retrieving electronic data based on two-way personalized data interactions between a client computer and a server computer. The approach implements a virtual memory stick ("VMS") and includes a VMS registration process. Once the VMS is registered, the VMS is used to provide security measures for secure delivery of encryption keys and other information needed to ensure personalized security of communications between the client computer and the server computer.

Figure 1:
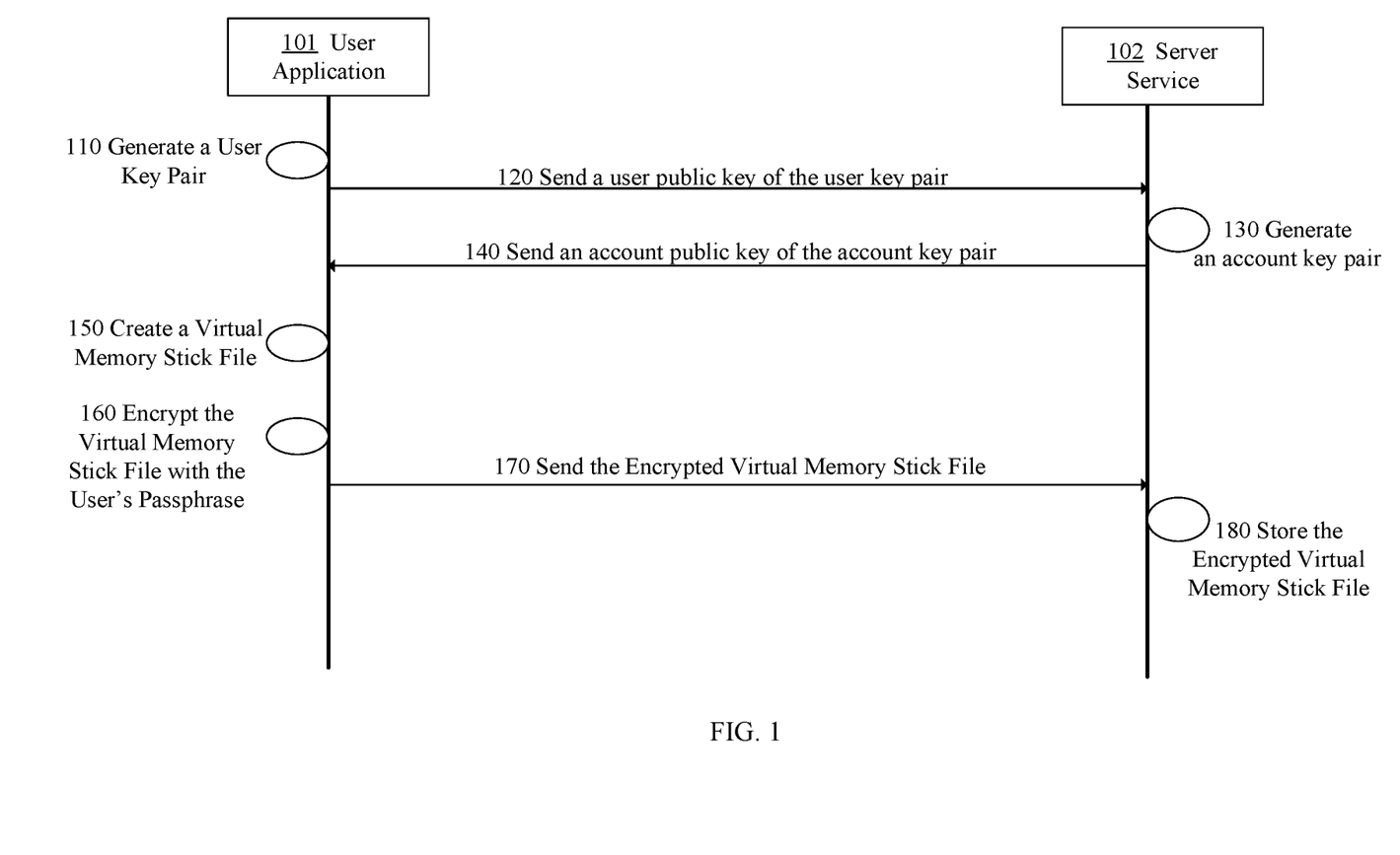
FIG. 1 is a time chart of a virtual memory stick file registration process.

FIG. 1 is a time chart of a VMS file registration process. The registration process includes exchanging information between a user application 101 and a server service 102 (also referred to herein as a server).

In an embodiment, a VMS registration processes starts by executing user application 101 on a client computer that in turn communicates with server service 102.

In step 110, user application 101 is executed to generate a user key pair. The user key pair may include a user public key and a user private key.

In step 120, user application 101 is executed to send the user public key of the user key pair to server service 102. Upon receiving the user public key, server 102 may store the user public key, and later use the key to encrypt information intended to a user application 101 from a server 102.

In step 130, server service 102 generates an account key pair. The account key pair includes an account public key and an account private key.

In step 140, server service 102 sends the account public key of the account key pair to user application 101. User application 101 may store the account public key, and later use the key to encrypt information intended to a server 102 from a user application 101.

In step 150, user application 101 is executed to create a VMS file and to include various keys in the file. An example of the VMS file structure is described in detail in FIG. 4.

In step 160, user application 101 is executed to encrypt the VMS file with a protection passphrase. The protection passphrase may be created by a user, and the user needs to remember the protection passphrase for future references. For example, the user may need the protection passphrase when s/he will request the VMS file in the future.

In step 170, user application 101 is executed to send the encrypted VMS file to server service 102.

Upon receiving the encrypted VMS file, server service 102, in step 180, encrypts the file with the server's master key, creates a user account record in a storage device, stores the encrypted VMS file in the storage device, and links the user account with the encrypted VMS file. This step completes the registration of the VMS file.

Later on, when a user wants to transmit electronic data, the user may request the VMS file from server service 102 and use the VMS file to perform a mutual authentication of the user and the server.

In an embodiment, a VMS file serves two purposes: first, the VMS file may be used to perform a mutual authentication of a user and a server by determining whether the user and the server can trust each other. Second, if the user and the server trust each other, then the VMS file may be decrypted using certain keys, and the decrypted VMS may provide keys to be used to encrypt and decrypt electronic data communicated by the user.

Figure 4:
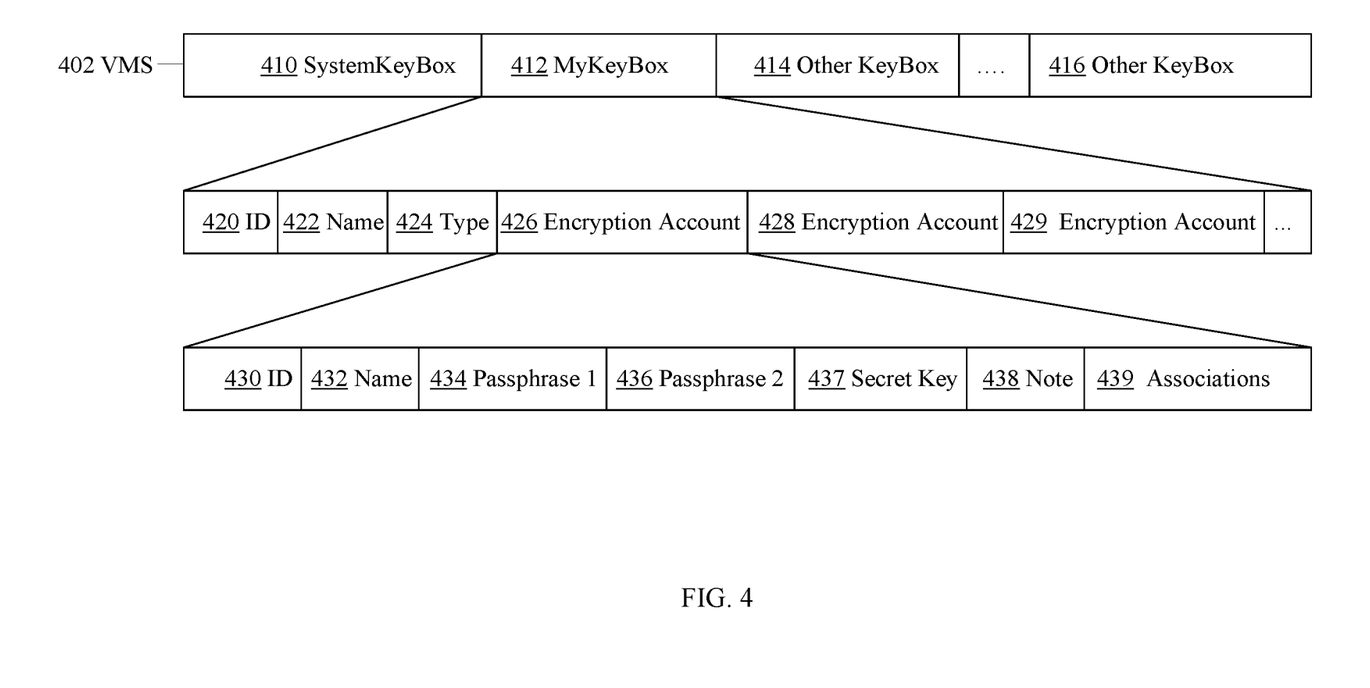
FIG. 4 is a block diagram depicting an example of a full version virtual memory stick file.

For example, using user application 101, a user may request access to server service 102. Upon receiving the request, server service 102 may send a login webpage to request the user to provide a login name so the server may find a user account record and retrieve a login VMS, i.e. a short version of a VMS containing a system key box only 410 as shown in FIG. 4. The server service 102 may send that login VMS together with a second login webpage to request the user to provide a login password. The user is expected to provide user login password and one or more passphrases to decrypt the received VMS, which is then used by user application 101 to encrypt the hash of a login password. If the decryption of a login VMS is successful, then the user may assume that the server is legitimate as it provided the valid VMS file. Subsequently, the user may increase its own level of trust in the server.

Once the user provides the encrypted hash of a login password, server service 102 may use the encrypted hash of a login password to authenticate the user. If the user fails to provide the correct encrypted hash of a login password, then server service 102 may assume that the user is not a legitimate user and may fail to provide a full version VMS file 402 (see FIG. 4.) to user application 101. However, if the authentication of the user is successful, then server service 102 may increase its own level of trust in the user. Subsequently, server service 102 may provide an encrypted full version VMS file, which user application 102 may attempt to decrypt using previously entered passphrases.

On the other hand, if user application 101 is unable to decrypt the VMS file received from server service 102, then the user may assume that server service 102 that provided the VMS file is an illegitimate server or that for some reason the VMS file became corrupted. Therefore, the user may reject the VMS file and decrease its own level of trust in the server.

In an embodiment, an approach described herein provides convenient and robust security mechanisms for delivering encryption keys to users. For example, it solves the need to have the keys travel with the users. According to the present approach, the keys do not travel with the users because the users can access the keys from a server any time and from any place.

Furthermore, the approach eliminates a need to store the keys on a memory stick, a flash drive, or a mobile device. The approach also eliminates the need to carry the portable device storing the keys and thus risking having the portable device and keys stolen or misplaced. Moreover, it provides the security mechanisms that are superior to conventional encryption mechanisms in which the keys may be compromised by malware.

In an embodiment, an approach described herein allows creating a VMS file containing encryption keys. The VMS file is encrypted with a protection passphrase and a server master key and stored in a server.

After a VMS file is stored in a server, a user may request the VMS file to retrieve encryption keys. To do so, the user may log in to a portal of the server. If the user determines that the server is a trusted server, and if the server determines that the user is the trusted user, then the user may obtain the VMS file from the trusted server.

In an embodiment, an approach described herein provides security measures that exceed the ability of conventional servers to authenticate a user based on the user's credentials and the SSL/TLS mechanisms. Without the presented approach, even if a server successfully authenticates the user's credentials, the SSL/TLS may not prevent malicious interception of data as the data is transmitted between a user application and the server. For example, a conventional server can only authenticate the user's credentials, but not the user. Since the credentials could be stolen, the conventional server is unable to determine whether the credentials have been provided by a legitimate user or an imposter. The presented approach solves that problem by registering and using a VMS file, as described in detail later.

According to another example, in conventional systems, authentication based on a certificate does not authenticate an owner of the private key linked to the certificate. A private key could be stolen, or the certification process could be fraudulent. The user may not have the skills to verify the owner of a private key. The presented approach solves that problem by relying on a VMS file.

According to other example, in conventional systems, if user credentials are stolen by an imposter, then the user's resources become accessible to the imposter because s/he may use the credentials without any obstruction. The presented approach solves that problem by registering and using a VMS file.

According to other example, once user credentials are verified by a conventional server, the SSL/TLS mindlessly delivers data to and from the user and does so without verifying whether the user credentials were indeed provided by a legitimate user. The presented approach requires verifying whether the credentials have been provided by the legitimate user.

2. Virtual Memory Stick Registration Process

In an embodiment, a user and a server are assigned two types of secrets: the secrets are mutually shared between the user and the server, and the secrets are not shared even though they are used in the communications process. Examples of the secrets that are mutually shared between the user and the server may include two pairs of public/private keys, where the public keys of the pairs are exchanged, and each private key is kept undisclosed another party. These key pairs are used to facilitate the communications of data to and from the user. However, the keys can be used after the user and the server determine that they can "trust" each other. The process of developing trust between the user and the server involves using the keys that are not shared between the user and the server.

In an embodiment, a secret that is not shared between a user and server is encoded in a VMS file and provides security mechanisms that are stronger than for example, a conventional certification of public keys. One of the drawbacks of the conventional certification is that the certification is rather complex and difficult to manage when it involves a large number of user accounts. Another drawback of the certification is that the certificates are a device-bound rather than a user-bound, and therefore they have to be stored and well protected.

Figure 2:
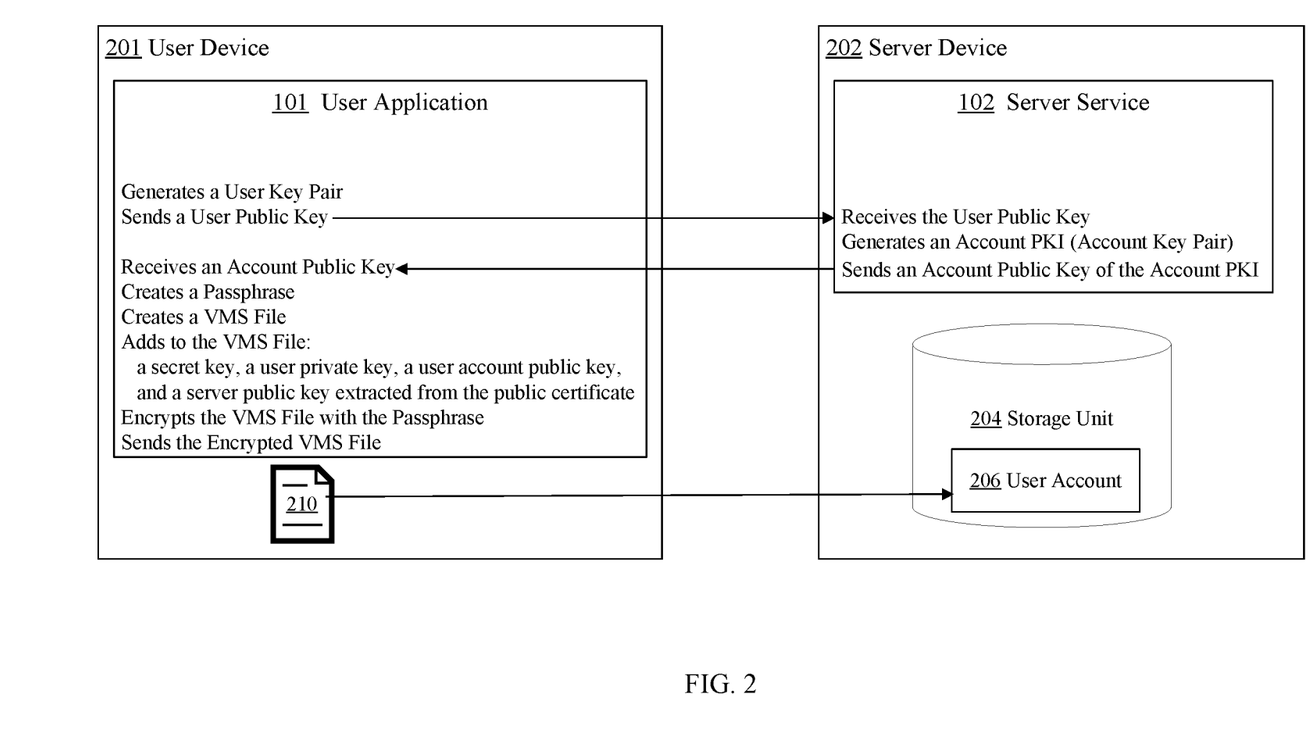
FIG. 2 is a block diagram depicting a virtual memory stick file registration process.

FIG. 2 is a block diagram depicting a VMS file registration process. In the depicted process, a user, executing user application 101 on a user device 201, is in control of a key generation and protection, and a server, executing server service 102 on a server device 202, is in charge of storing the secure key. During the VMS file registration process, user application 101 is executed to generate a user key pair with specifically designed registration features. Once the user key pair is generated, a user public key of the user key pair is sent from user device 201 to server device 202.

Meanwhile, server service 102 executing on server device 202, generates an account key pair with a tool that is under control of server service 102 or other dedicated software application. Once the account key pair is generated, an account public key of the account key pair is sent from server device 202 to user device 201.

Once both applications exchange their respective public keys, a user, using user application 101, may create one or more passphrases and a VMS file. Then, various keys, such as a secret key, a user private key, a user account public key, and a server public key extracted from the public certificate, may be added to the VMS file. The VMS file is then encrypted with one or more passphrases created by the user, to generate an encrypted VMS file 210. Encrypted VMS file 210 is then sent to server service 102.

Upon receiving encrypted VMS file 210, server service 102 may create a user account 206 in a storage unit 204, and store encrypted VMS file 210 in storage unit 204.

In the future, encrypted VMS file 210 may be used to determine whether a user and a server trust each other, and if they do, to provide encryption and decryption keys to the user. To start a mutual authentication with the server, the user may request a login page from the server, and the server may respond with the login page which requests the user to provide a valid login name, login password and one or more VMS encryption passphrases. If the user fails to provide the valid one or more passphrases, then the server may assume that the user is not a legitimate user and may refuse to provide encrypted VMS file 210.

Assuming, however, that the user provided a valid passphrase and was able to decrypt the login VMS, to ensure authenticity of the server, the user may request the server to provide encrypted full version VMS file 210. If the user receives encrypted login VMS file 210 but fails to decrypt encrypted VMS file 210 with the user created one or more passphrases, then the user may assume that the server is not a legitimate server.

However, if the user succeeds in decrypting encrypted VMS file 210, then the user may assume that encrypted VMS file 210 was provided by a legitimate server. At this point, the user and the server may start trusting each other.

3. Two Layers of Security

In an embodiment, an approach presented herein provides two layers of securities. A first layer of security is an "external" layer of security and may rely on implementing the TLS anonymous X.509 certificate. A second layer of security is a VMS-based layer.

Figure 3:
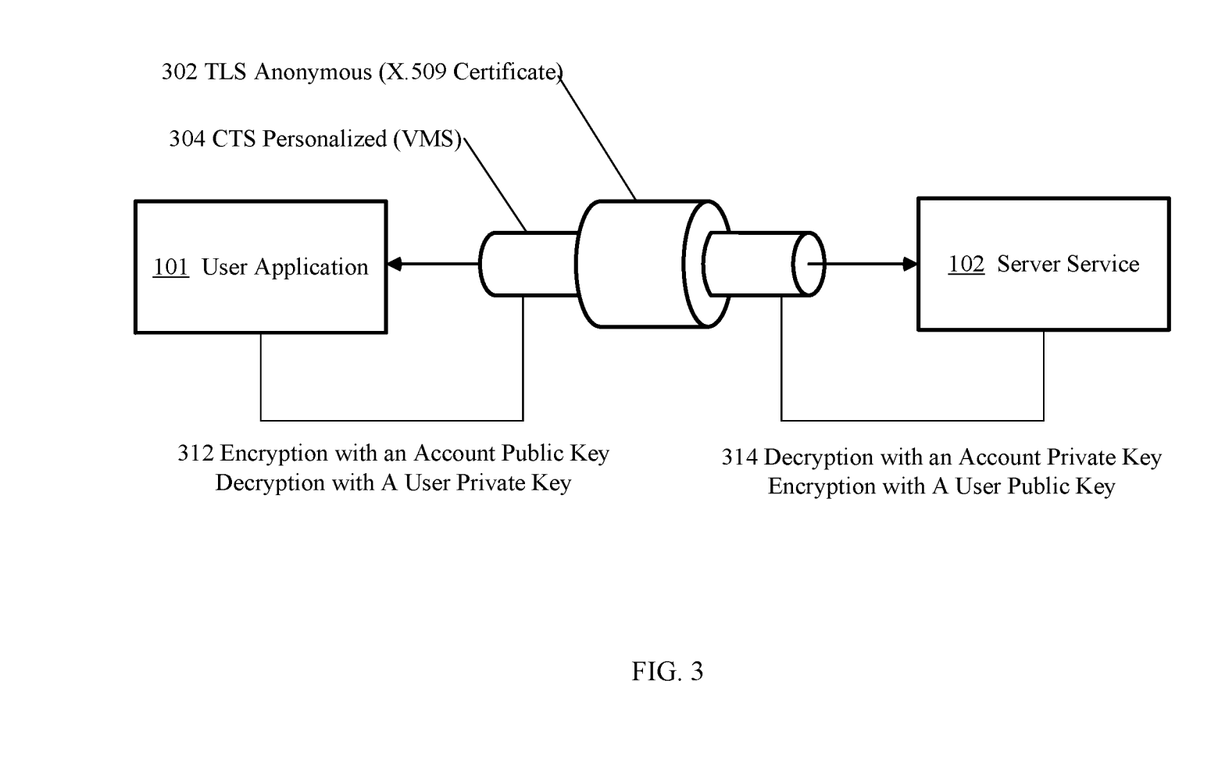
FIG. 3 is a block diagram depicting two example layers of security of a virtual memory stick-based approach.

FIG. 3 is a block diagram depicting two example layers of security of a VMS-based approach. In the depicted example, a first layer (an external layer 302) may be implemented as the TLS anonymous layer and based on an X.509 certificate. A second layer (an internal layer 304) may be implemented using the VMS approach, including a ciphertext stealing ("CTS") personalized VMS.

Using the two-layer-security approach, certain keys may be already in possession of communicating parties so that the parties can use the keys to verify whether they can trust each other. Also, instead of creating a symmetric session key exchanged under protection of a public key of one party, the symmetric key may be created for each message. While this creates another layer of processing, it provides more secure mechanisms than those that have only one layer of security.

In an embodiment, implementations of a VMS with encryption keys enables mutual authentication of a server and a user at both ends of a communications pipe. Specifically, it enables a challenge-and-response login process that allows the user and the server to use the VMS to verify each other.

4. Example Keys

One of the purposes of a VMS is to enable a secure delivery of a set of encryption keys and other information needed to facilitate personalized security of data communications. The keys included in the VMS may include a user private key, an account public key, a server public key, and a symmetric key. Additional keys may also be included in the VMS.

A user private key is one of the keys in a user key pair generated for a user. The user private key may be used by the user to decrypt response messages received by the user, and to digitally sign request messages that the user transmits out.

An account public key is one key of the keys in an account key pair generated by a server. The account public key may be provided to a user by the server. The account public key may be used by the user to encrypt request messages transmitted by the user and to verify digital signatures of response messages received by the user.

A server public key may be used to verify digital signatures appended to a server public certificate to automatically authenticate the source, i.e., the server. For example, the server public key may be used to verify if a server public certificate was sent by a legitimate source or an illegitimate source as the valid server public certificate may be sent by either the legitimate source or the illegitimate source. It should be noted that the certificate may be valid even if it is provided by an illegitimate source. This may happen when the source is spoofed, and an illegitimate party pretends to be the valid source.

A symmetric key may be used to sign and verify a hashed-based message authentication code ("HMAC") of messages. This key may be optional.

To ensure a secure delivery a VMS, the VMS may be encrypted with several different keys. For example, the VMS may be encrypted with one or more key protection phrases and/or a key code sequence. The key protection phrases are typically known only to a user/owner of the VMS. The key code sequence is typically known only to the user and the user's account.

A VMS may be delivered from a server to a user without a full authentication of the user because the VMS itself may be used to mutually authenticate the user and a server.

5. Virtual Memory Stick as a Portable Secure Filing System

In an embodiment, a VMS is a Portable Secure Filing System ("PSFS") that contains directories and files organized in the same way as on a physical media, but it only exists in a digital space. The VMS/PSFS may be saved in a single data file or a database field of a database. The content of the VMS may be extracted onto a physical media such as a disk and used to create directories and files on the disk.

6. Two Types of Virtual Memory Sticks

To protect encryption keys that are used to encrypt data, two types of VMSs may be implemented: a login VMS and a full version VMS. A login VMS may contain only system keys that are used for authentication and a message encryption and decryption for the authentication purposes.

A full version VMS may contain all keys that are included in a login VMS, and all the keys used to encrypt/decrypt data in storage and in transit.

7. Full Version Virtual Memory Stick Files

A full version VMS file is used to support key-based-encryption of data belonging to one or more user accounts.

FIG. 4 is a block diagram depicting an example of a full version VMS file. The depicted example is provided to merely illustrate one example implementation of the full version VMS file. In the depicted example, a full version VMS 402 comprises a system key box 410, and a plurality of key box, such as my key box 412, and one or more other key boxes 414, 416.

In an embodiment, my key box 412 includes an ID 420, a name 422, a type 424, and one or more encryption accounts 426, 428, 429. Type 424 may be used to describe whether the accounts are used for an individual encryption (where a single account encrypts for a single user), or for a group encryption (where all accounts encrypt for multiple users).

8. Example Encryption Accounts

An example encryption account 426 may include an ID 430, a name 432, one or more passphrases 434, 436, a secret key 437, a note 438, and associations 439.

ID 430 may be used to identify the encryption account and may be also attached to a VMS file to locate a key during decryption.

Name 432 may be an alphanumerical string that can be recognizable by a user.

One or more passphrases 434, 436 may be encryption passphrases that can be created by a user or by a cryptographic random generator. Alternatively, passphrases 434, 436 may be cryptographic binary keys. If a PKI is used, then a passphrase may contain an asymmetric public or private key.

Secret key 437 may be a passphrase that is generated by a cryptographic random generator and used to generate and verify HMAC signatures. The approach may use a hash value (also referred to herein as a hash or a message digest) to encrypt information. The hash may be a number generated from a text string. The hash may be substantially smaller than the text itself.

Note 438 may include a brief description of the purpose of the account.

Associations 439 may contain paths of files encrypted with the account if identifiers are not attached to those files.

In an embodiment, the approach may allow detecting forged emails. Forgery of an email may include forging the email's header so that the message appears to have originated from someone other than the actual source.

In an embodiment, the approach may allow detecting email spoofing. Email spoofing is a tactic used in phishing and spam campaigns and includes sending emails that falsely appear to be sent by a legitimate source.

9. Verifying Authenticity of a Server

In an embodiment, a VMS is used to overcome difficulties in verifying authenticity of a server using conventional approaches. Verifying authenticity of a server using conventional approaches based on the server's certificate is often insufficient. In some cases, the verification of the owner of a private key related to the server certificate may be unreliable if the certification was for example, fraudulent. In other words, just because the server certificate has a valid certification chain, relying on the server certificate may be insufficient to prove the authenticity of the server. Although the server certificate itself can be verified, completing the verification process may require obtaining some information from a user.

Figure 5:
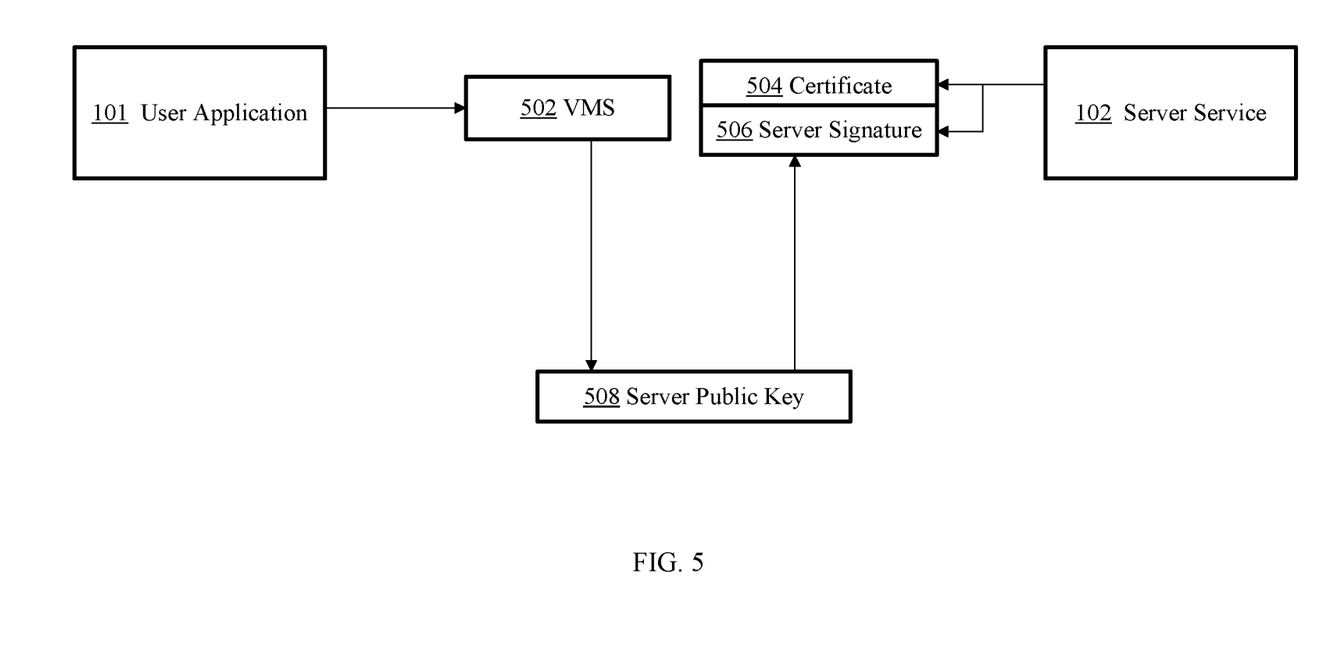
FIG. 5 is a block diagram depicting an example process for verifying authenticity of a server.

FIG. 5 is a block diagram depicting an example process for verifying authenticity of a server. During a login process, server service 102 may send its own server certificate 504 along with a server signature 506 generated based on the corresponding private key. The private key is not the source of a signature, but it is used to create one. For example, the signature may be created by encrypting, using the private key, a hash generated from a byte array of data.

Upon receiving server certificate 504 along with signature 506, a user, using user application 101, may attempt to use a server public key 508, extracted from a VMS file 502, to decrypt server signature 506. If the verification of server signature 506 fails, then the user may conclude that the private key used to create the signature is incompatible with the key used by the user. Therefore, the user may conclude that the certificate should be rejected even though it has a valid certification chain. Furthermore, the user may conclude that the VMS might have been intercepted or misappropriated, resided on an unauthorized server, and/or been misused by an illegitimate party.

However, if the user requests, but does not receive VMS file 502, or receives VMS file 502 but cannot decrypt the file, then the user may conclude that the user interacts with an illegitimate server, not the server with which the user intended to communicate.

10. Example Challenge-and-Response Login Protocol

In an embodiment, an approach overcomes the shortcomings of a traditional authentication login process. In a traditional login process, a server receives user credentials, uses the received user credentials to perform authentication, and if the authentication is successful, determines the rights granted to the user with respect to the requested resource. This process may have at least two flaws. First, the server cannot verify whether the credentials came from a legitimate user or an imposter. Second, the user cannot be sure that his/her credentials were sent to a legitimate server. Although the SSL/TLS verifies the validity of a certificate, it may be difficult to verify the owner of a private key linked to the certificate because it may be difficult to verify whether the certificate was provided by a legitimate party.

In an embodiment, an approach uses a VMS to facilitate a trust building login process at both sides: a user side and a server side. An example trust building login process is depicted in FIG. 6.

Figure 6:
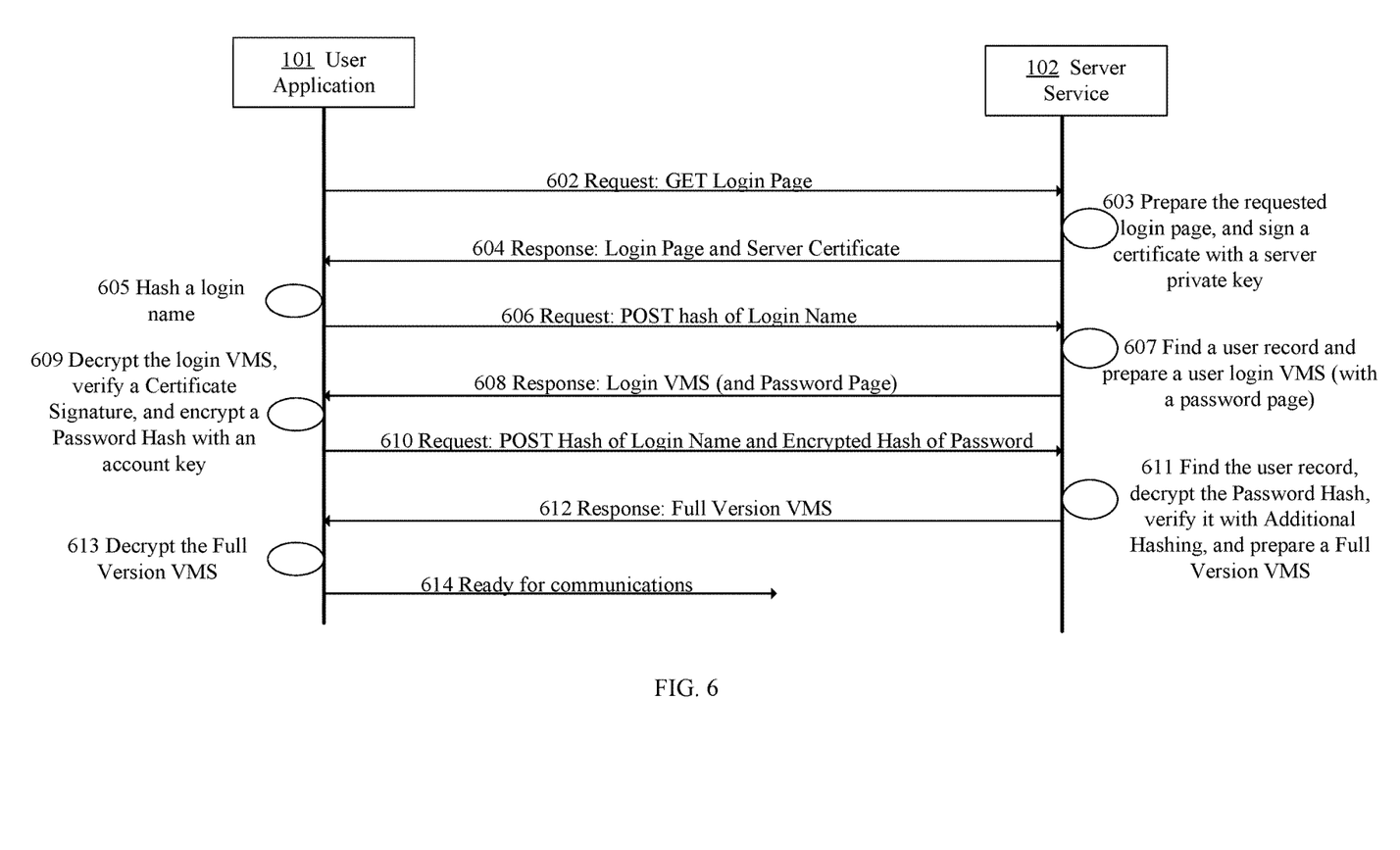
FIG. 6 is a block diagram depicting using a virtual memory stick file to build trust between a user and a server.

FIG. 6 is a block diagram depicting using a virtual memory stick file to build trust between a user and a server.

In step 602, using user application 101, a user requests a login page from a server.

In response to receiving the request, server service 102 prepares, in step 603, the requested login page. Concurrently, a public certificate (different from that used for the SSL/TLS communications) is delivered. The certificate is additionally signed by server service 102 with a corresponding server private key so that the user could later verify it with a public key stored in a VMS. The VMS may be obtained later on. For now, the user is only giving away a hashed login name. At this point, no mutual trust between the user and the server exists.

In step 604, server service 102 sends a response that includes the login page and the server certificate.

In step 605, using user application 101, the user hashes a login name.

In step 606, user application 101 provides the hashed login name to server service 102. The information may be encrypted with the received public key certificate.

In step 607, based on the hashed login name, server service 102 attempts to find a user record, and if it finds the user record, then it attempts to find a user login VMS in the user record. If it succeeds, then it proceeds to step 608.

In step 608, server service 102 sends the login VMS and a password page (having a password field) to user application 101. At this point, some mutual trust between the user and the server exists, but it is very limited.

In step 609, using user application 101, the user decrypts the login VMS, and verifies a certificate signature. To decrypt the login VMS, the user may use a passphrase and/or other mechanisms to decrypt/unlock the received login VMS. To verify the certificate signature, the user may use a server public key. This verification allows user application 101 to determine whether the server provided the correct VMS and whether the server is in possession of the same private key that was used to register the VMS. If the verification is unsuccessful, then user application 101 may automatically determine that spoofing has occurred and may prevent the user from revealing a password.

However, if the verification is successful, then the user may determine that spoofing has not occurred. At this point, the user's trust in the server increases significantly because the server has provided the correct VMS and the same certificate that corresponds to the one used to register the VMS. However, the server trust in the user has not yet changed.

If the certificate signature is successfully verified, then user application 101 encrypts a password hash with an account public key.

In step 610, using user application 101, the user sends the hashed login name and the password hash encrypted with the account public key to server service 102.

In step 611, if server service 102 finds the user record, then the server service 102 retrieves a user account private key from the record and attempts to decrypt the password hash with the user account private key to verify the password. If server service 102 cannot successfully verify the password, then server service 102 may assume that the user is an illegitimate user.

However, if server service 102 successfully verifies the password, then server service 102 determines that the user was in possession of the valid login credentials such as the login name, the login password and one or more VMS encryption passphrases. At this point, the user and the server trust each other.

In step 612, server service 102 sends a full version VMS to user application 101.

In step 613, the user decrypts the full version VMS. Although both parties can trust each other now, the parties still apply the user/account encryption keys in addition to the SSL/TLS and SSH keys. Subsequently, in step 614, the user may start communications using the keys stored in the VMS.

11. Protecting Synchronized Folders Against Ransomware

Over the years, protecting data folders against ransomware became a rather arduous task. Some of the challenges are described in reference to FIG. 7A.

Figure 7A:
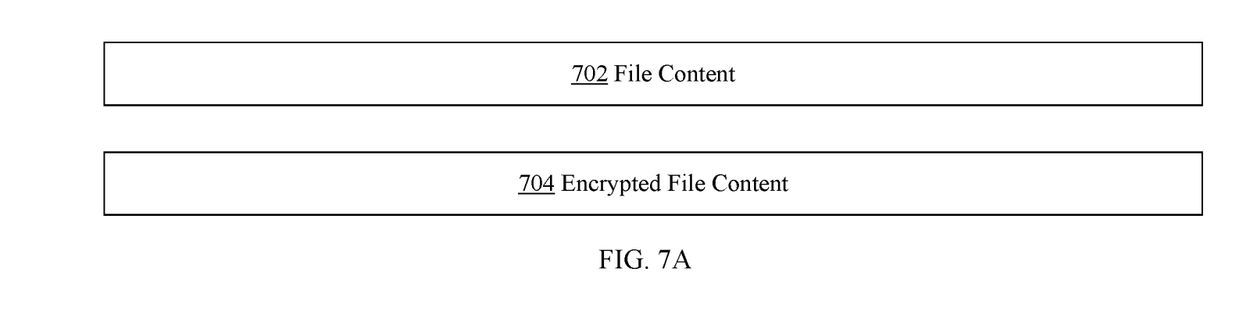
FIG. 7A is a block diagram depicting an example of unauthorized encryption.

FIG. 7A is a block diagram depicting an example of unauthorized encryption. In the depicted example, file content 702 is encrypted using malware to generate encrypted file content 704. Malware that is used to encrypt file content 702 for ransom usually encrypts the entire content of the file. Once the file is re-saved on a disk as encrypted file content 704, it also receives a new timestamp. Receiving the new timestamp triggers a synchronization service to upload that file to a cloud storage facility as a more recent file. This may "infect" a backup storage and detecting file content 704 encrypted using malware may be impossible.

To prevent that, both an unencrypted file and an encrypted file are embedded with a mark. A mark may include identification information and may be kept in an open form so that a synchronization service may recognize the mark and use it to determine whether the file was encrypted or not. If the mark cannot be located, then the synchronization service assumes that the file was subjected to an unauthorized modification such as encryption with malware. Subsequently, the synchronization service may prevent the file from being uploaded to a backup storage.

While this approach does not prevent a file from being encrypted using malware, it does prevent the file from being uploaded to a backup storage, and it does prevent turning the backup storage into a useless collection of files encrypted with unknown keys. Although the latest updates to the files encrypted with malware cannot be recovered, the previous versions or the latest unchanged versions of the files can be restored. If edited files are regularly saved, then the risk of losing content of potentially infected files can be minimized, especially if a synchronization service notifies the user about a first encounter with a ransom encrypted file.

Figure 7B:
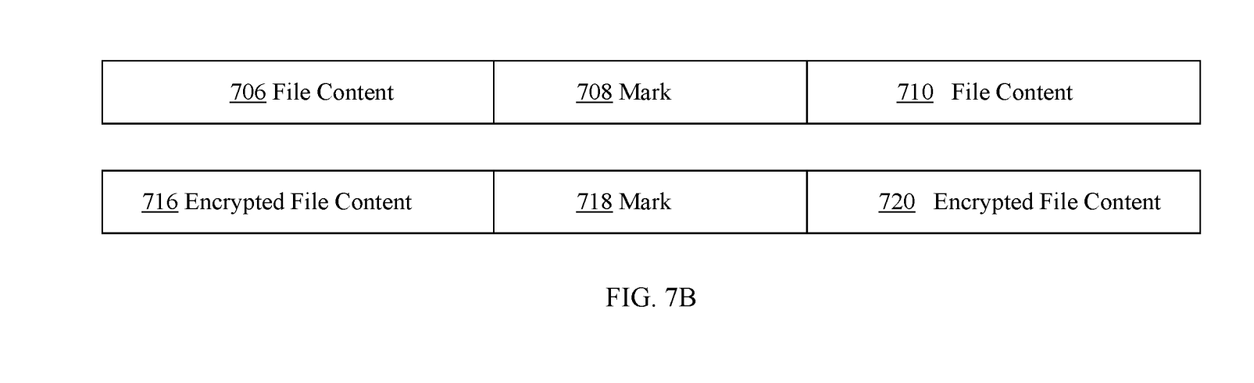
FIG. 7B is a block diagram depicting security mechanisms for protecting synchronized folders against ransomware.

FIG. 7B is a block diagram depicting security mechanisms for protecting synchronized folders against ransomware. In the depicted example, a data folder includes a file content 706, a mark 708, a file content 710, and potentially other marks and file contents.

Mark 708 indicates that a processing service is requested for files included in a folder. Mark 708 may be embedded at any location in a file. Mark 708 may be especially important for encrypted files because authorized and unauthorized encryptions look the same. If mark 708 is embedded after an authorized encryption of a file, then embedding mark 708 in the file can make the file a bit longer. Mark 708 is recognizable, and the recognizable mark can be easily located and removed prior to decryption. As long as recognizable mark 708 can be located, the processing service may assume that the encryption is legitimate.

However, if an unauthorized encryption is used to encrypt data files in a folder, then the unauthorized encryption may obliterate the mark. If the mark is obliterated, then it cannot be recognized in the file or the folder. If the processing service is unable to detect the mark, then the processing service may determine that the unauthorized encryption has been used. Thus, the processing service may detect an intrusion and suspect that an imposter used incorrect encryption keys and maliciously encrypted the files for ransom.

12. Generating Passphrases

In an embodiment, a VMS is encrypted with one or more protection passphrases. The passphrases may be generated by a user in advance, and typically, the passphrases are not communicated via the Internet. However, even though the passphrases are not communicated via the Internet, the phrases may be intercepted. For example, a keystroke logging malware may be downloaded onto on a user device and executed to detect the passphrases, intercept them, and forward them to a hacker.

In an embodiment, to remedy the problem, a virtual keyboard is implemented. The virtual keyboard may be configured to allow a server and a user share a passphrase sequence without directly disclosing it, and thus without allowing any malware to intercept it.

Figure 8A:
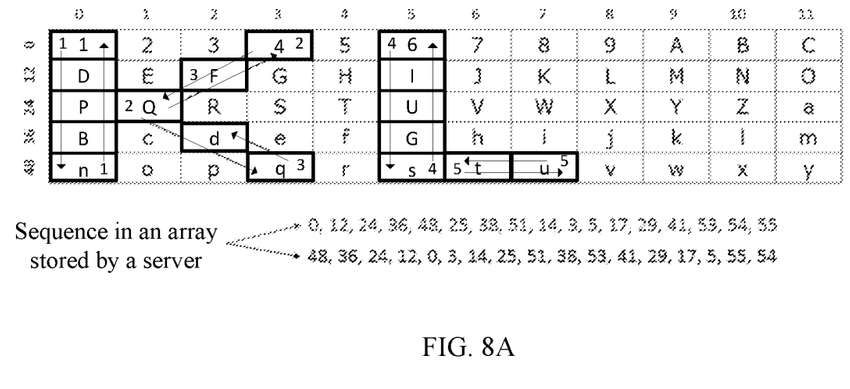
FIG. 8A is a block diagram depicting an example process for providing a passphrase sequence.

FIG. 8A is a block diagram depicting an example process for providing a passphrase sequence. In the depicted example, a user receives a display of an array comprising a plurality of elements. The array of elements may include for example, 60 elements arranged in 5 rows and 12 columns, as depicted in FIG. 8A. The virtual keyboard may have a randomized layout of the elements, and each element depicted in the virtual keyboard may represent a key. For clarity, a "0" may be dropped to avoid confusion with a capital "O". Also, the Verdana font may be used to distinguish between a small "l" and a capital "I".

In an embodiment, the displayed array is used by a user to define a passphrase sequence. For example, the user may select, from the displayed array of elements, a plurality of keys to define the passphrase sequence. The selected passphrase sequence needs to be memorized by the user.

The selected passphrase sequence may be memorized by the user in any of several ways. One way is to memorize a graphical arrangement of the keys of the passphrase sequence as the passphrase is displayed within the displayed array. For example, referring to FIG. 8A, the user may memorize that his/her passphrase sequence appears to graphically correspond to a text "I C L" built from the selected keys because the passphrase includes all keys in a first column, a middle key in a second column, a second key and a fifth key in a third column, all keys in a sixth column, a bottom key in a seventh column, and a bottom key in a eight column.

Another way that the user may memorize a passphrase sequence is applicable if the selected keys form some geometric shapes, such as one or more lines, one or more triangles, one or more rectangles, or a combination of those. For example, if a user selects, in the displayed array, all keys that are in a third row of the displayed array, then the user may memorize the key sequence as being the entire third row of the array.

Other way of defining a passphrase sequence is verbal or using words. This may be suitable for devices that have a pointing device such as a mouse, because that sequence is only safe with hover clicks.

To forward an encryption passphrase to a user, a server generates a random key code sequence that may have the length of a passphrase sequence generated by the user. Then, the server may store the random key code sequence in a user account record.

When a user requests a VMS file from a server, the server may retrieve the VMS file from a storage unit maintained by the server, encrypt the VMS file with that phrase, fill an array of 60 elements of a keyboard array with that phrase according to the key code sequence, and fill the remaining elements with randomly selected characters. The last step makes sure that each code contained by an encryption phrase occupies multiple elements of the 60 element-keyboard-array to confuse a hacker or an over-the-shoulder-watcher to prevent him from guessing the key code sequence. Then, the server may provide the array to a user device and cause the user device to display the keyboard array for the user.

Figure 8B:
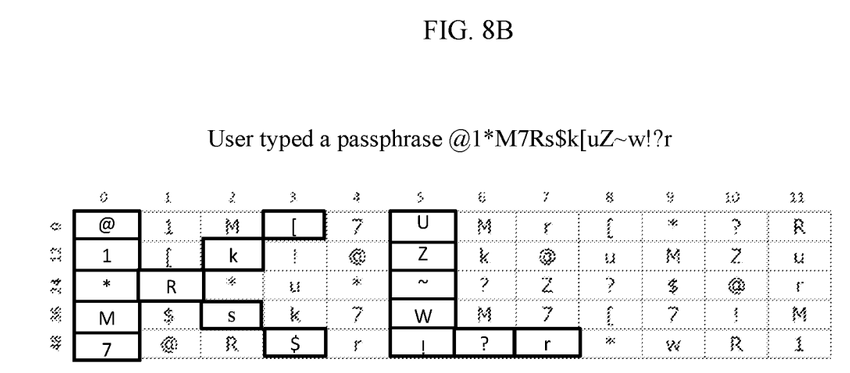
FIG. 8B is a block diagram depicting an example process for providing a passphrase sequence to be checked whether it matches a key code sequence stored in a server.

FIG. 8B is a block diagram depicting an example process for providing a passphrase sequence to be checked whether it matches a key code sequence stored in a server. In the depicted example, the received keyboard array has 5 rows and 12 columns labeled with various characters. It should be noted that the arrangement of characters displayed in the keyboard array depicted in FIG. 8B is different than the arrangement of characters displayed in the array depicted in FIG. 8A.

The received keyboard array may be displayed in at least two different modes. In a first mode, the keyboard array is displayed directly, and the user selects the keys from the displayed keyboard array according to for example, a graphical arrangement that the user memorized and that graphically corresponds to the passphrase sequence that the user typed in, as shown in FIG. 8A. For example, if the remembered passphrase sequence graphically corresponded to the word "I C L", then the user may select, from the displayed keyboard array, the keys that would form the arrangement graphically corresponding to the word "I C L".

As depicted in FIG. 8B, the selected keys would form a string "@1*M7Rs$k[uZ~w!?r". It should be noted, however, that the passphrase itself is not the string "@1*M7Rs$k[uZ~w!?r", but the randomly generated key code sequence that the server generated, as described in FIG. 8A. Hence, even if the prying eyes of an imposter see that the user entered the string "@1*M7Rs$k[uZ~w!?r", the string "@1*M7Rs$k[uZ~w!?r" will be useless to the imposter because that string is only valid once; it is valid only when it is received, and not in the future.

In a second mode, a keyboard array is displayed as a standard key layout as previously shown, but the codes are mapped based on the received keyboard array. In this mode, the user needs to find, in the displayed keyboard array, the keys that constitute the originally defined passphrase sequence. The user may for example, hover a pointer device over the characters derived from the remembered passphrase sequence, and have the keys translated into an encryption passphrase. To make the process even more complex, every time a key is mapped, its corresponding code may be removed so that hovering the first time produces a character, but it does not produce a character the next time. Therefore, the word "StrongPhrase351" may be interpreted as "StrongPhase351" because "r" can only be used once to ensure that the encryption phrase remains as sent by a server.

A virtual keyboard described in FIG. 8A-8B implements a key code sequence capability. It may be configured to allow a server and a user share an encryption key without risking that the key may be intercepted by malware.

13. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
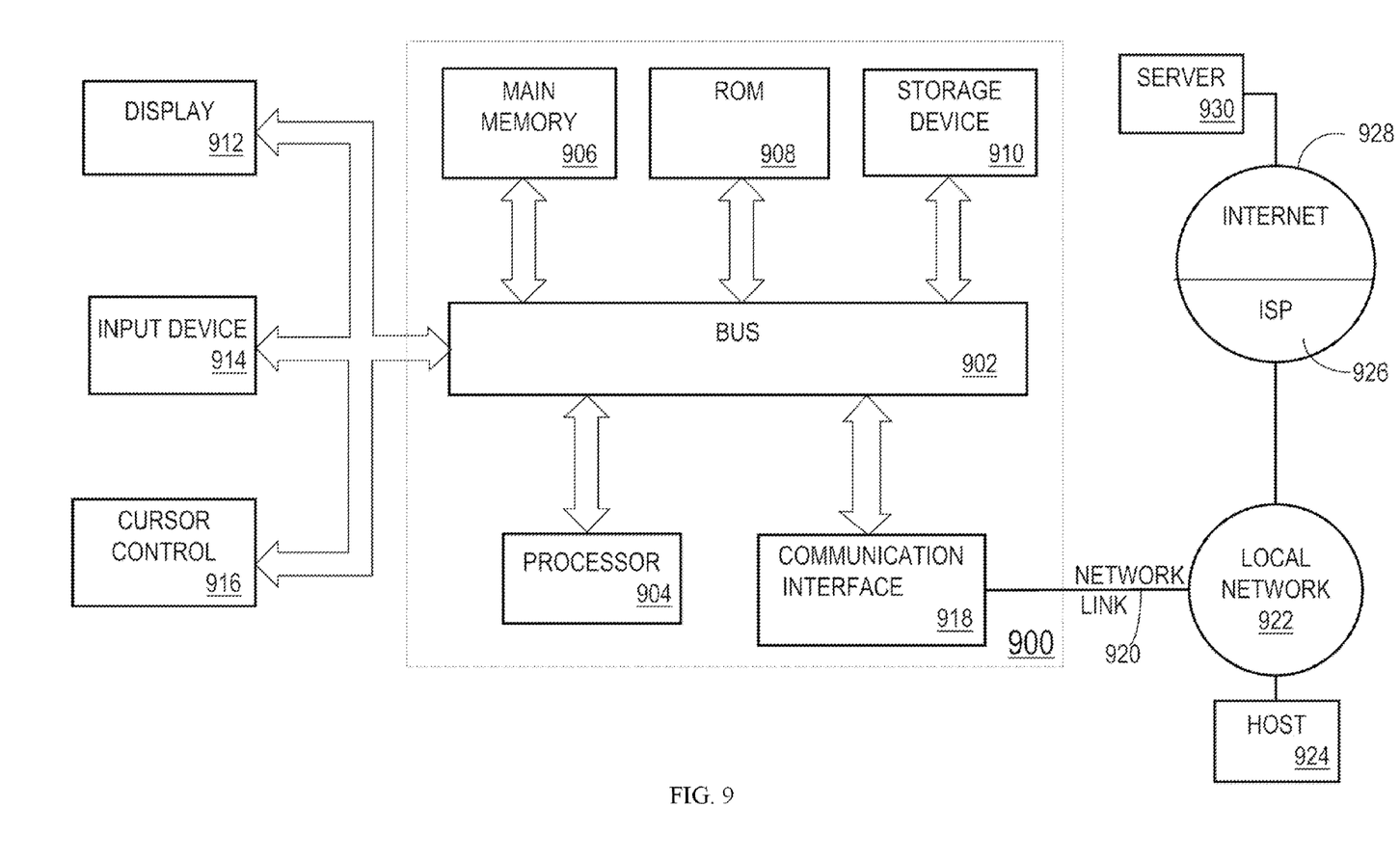
FIG. 9 is a block diagram that depicts an example computer system 900 upon which embodiments may be implemented.

FIG. 9 is a block diagram that depicts an example computer system 900 upon which embodiments may be implemented. Computer system 900 includes a bus 902 or other communication mechanism for communicating information, and a processor 904 coupled with bus 902 for processing information. Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic or computer software which, in combination with the computer system, causes or programs computer system 900 to be a special-purpose machine. According to one embodiment, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the approach. Thus, embodiments are not limited to any specific combination of hardware circuitry and software.

The term "computer-readable medium" as used herein refers to any medium that participates in providing data that causes a computer to operation in a specific manner. In an embodiment implemented using computer system 900, various computer-readable media are involved, for example, in providing instructions to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated service digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world-wide packet data communication network now commonly referred to as the "Internet" 928. Local network 922 and Internet 928 both use electrical, electromagnetic or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for providing improved personalized security mechanisms based on key codes and a virtual keyboard, the method comprising:
   generating, by a server computer, a virtual keyboard and configuring the virtual keyboard to provide an interface between the server computer and a user device and to allow the server computer and the user device to generate a passphrase sequence without disclosing the passphrase sequence to others or allowing malware to intercept the passphrase sequence;
   wherein the virtual keyboard comprises an array of elements that have been randomized each time a user is prompted to provide a key string, so that an element, of the array of elements, located at a location in the virtual keyboard is different than a keyboard element, of a plurality of typical keyboard elements of a typical keyboard, located at a corresponding location in the typical keyboard, and is different than a keyboard random element, of a plurality of random elements of a virtual keyboard previously displayed by the server computer, located at the corresponding location in the previously displayed virtual keyboard;
   displaying, by the server computer, the virtual keyboard that is used to define the passphrase sequence for a file;
   receiving, by the server computer from the user device, the key string provided by a user using the virtual keyboard;
   generating, by the server computer, the passphrase sequence from the key string;
   generating a random key code sequence based on the passphrase sequence such that once the server computer generates the passphrase sequence from the key string received from the user device, the server computer derives a random key code sequence from the generated passphrase sequence;
   generating, by the server computer, an encrypted file by encrypting the file with the derived random key code sequence;
   associating the encrypted file with the derived random key code sequence;
   storing the encrypted file and the derived random key code sequence.

2. The method of claim 1, wherein the virtual keyboard is displayed in a mode in which the array of elements is displayed directly as a random keyboard arrangement different than a typical keyboard arrangement.

3. The method of claim 1, wherein the virtual keyboard is displayed in a mode in which the array of elements is displayed as a keyboard arrangement having a random mapping between the array of elements and elements of a typical keyboard arrangement.

4. The method of claim 1, wherein the passphrase sequence is provided based on a physical selection of elements of the array of elements of the virtual keyboard.

5. The method of claim 1, wherein the passphrase sequence is provided based on a verbal selection of elements of an array of elements of the virtual keyboard.

6. The method of claim 1, wherein the random key code sequence has a same length as the passphrase sequence.

7. The method of claim 1, further comprising:
   receiving, by the server computer, a request for accessing the file;

retrieving, by the server computer, the encrypted file and the random key code sequence from a storage unit maintained by the server computer;

transmitting, by the server computer, the virtual keyboard to the user device and causing displaying the virtual keyboard on the user device;

receiving, by the server computer, via the virtual keyboard, an encryption passphrase sequence;

comparing the encryption passphrase sequence with the random key code sequence;

in response to determining that the encryption passphrase sequence matches the random key code sequence, transmitting, by the server computer, the encrypted file to the user device;

in response to determining that the encryption passphrase sequence does not match the random key code sequence, transmitting by the server computer an error message to the user device.

8. One or more non-transitory computer-readable storage media storing one or more computer instructions which, when executed by one or more hardware processors, cause the one or more hardware processors to provide improved personalized security mechanisms for transferring electronic data, and to perform:

generating, by a server computer, a virtual keyboard and configuring the virtual keyboard to provide an interface between the server computer and a user device and to allow the server computer and the user device to generate a passphrase sequence without disclosing the passphrase sequence to others or allowing malware to intercept the passphrase sequence;

wherein the virtual keyboard comprises an array of elements that have been randomized each time a user is prompted to provide a key string, so that an element, of the array of elements, located at a location in the virtual keyboard is different than a keyboard element, of a plurality of typical keyboard elements of a typical keyboard, located at a corresponding location in the typical keyboard, and is different than a keyboard random element, of a plurality of random elements of a virtual keyboard previously displayed by the server computer, located at the corresponding location in the previously displayed virtual keyboard;

displaying, by the server computer, the virtual keyboard that is used to define the passphrase sequence for a file;

receiving, by the server computer from the user device, the key string provided by a user using the virtual keyboard;

generating, by the server computer, the passphrase sequence from the key string;

generating a random key code sequence based on the passphrase sequence such that once the server computer generates the passphrase sequence from the key string received from the user device, the server computer derives a random key code sequence from the generated passphrase sequence;

generating, by server computer, an encrypted file by encrypting the file with the derived random key code sequence;

associating the encrypted file with the derived random key code sequence;

storing the encrypted file and the derived random key code sequence.

9. The one or more non-transitory computer-readable storage media of claim 8, wherein the virtual keyboard is displayed in a mode in which the array of elements is displayed directly as a random keyboard arrangement different than a typical keyboard arrangement.

10. The one or more non-transitory computer-readable storage media of claim 8, wherein the virtual keyboard is displayed in a mode in which the array of elements is displayed as a keyboard arrangement having a random mapping between the array of elements and elements of a typical keyboard arrangement.

11. The one or more non-transitory computer-readable storage media of claim 8, wherein the passphrase sequence is provided based on a physical selection of elements of the array of elements of the virtual keyboard.

12. The one or more non-transitory computer-readable storage media of claim 8, wherein the passphrase sequence is provided based on a verbal selection of elements of an array of elements of the virtual keyboard.

13. The one or more non-transitory computer-readable storage media of claim 8, wherein the random key code sequence has a same length as the passphrase sequence.

14. The one or more non-transitory computer-readable storage media of claim 8, storing additional instructions for:

receiving, by the server computer, a request for accessing the file, retrieving, by the server computer, the encrypted file and the random key code sequence from a storage unit maintained by the server computer;

transmitting, by the server computer, the virtual keyboard to the user device and causing displaying the virtual keyboard on the user device;

receiving, by the server computer, via the virtual keyboard, an encryption passphrase sequence;

comparing the encryption passphrase sequence with the random key code sequence;

in response to determining that the encryption passphrase sequence matches the random key code sequence, transmitting, by the server computer, the encrypted file to the user device;

in response to determining that the encryption passphrase sequence does not match the random key code sequence, transmitting by the server computer an error message to the user device.

15. A server computer configured to provide improved personalized security mechanisms based on key codes and a virtual keyboard, the server computer comprising:

one or more hardware processors;

one or more memory units; and one or more non-transitory computer-readable storage media storing one or more computer instructions which, when executed by the one or more hardware processors, cause the one or more hardware processors to perform:

generating, by a server computer, a virtual keyboard and configuring the virtual keyboard to provide an interface between the server computer and a user device and to allow the server computer and the user device to generate a passphrase sequence without disclosing the passphrase sequence to others or allowing malware to intercept the passphrase sequence;

wherein the virtual keyboard comprises an array of elements that have been randomized each time a user is prompted to provide a key string, so that an element, of the array of elements, located at a location in the virtual keyboard is different than a keyboard element, of a plurality of typical keyboard elements of a typical keyboard, located at a corresponding location in the typical keyboard, and is different than a keyboard random element, of a plurality of random elements of a virtual keyboard previously displayed by the server computer, located at the corresponding location in the previously displayed virtual keyboard;

displaying, by the server computer, the virtual keyboard that is used to define the passphrase sequence for a file;

receiving, by the server computer from the user device, the key string provided by a user using the virtual keyboard;

generating, by the server computer, the passphrase sequence from the key string;

generating a random key code sequence based on the passphrase sequence such that once the server computer generates the passphrase sequence from the key string received from the user device, the server computer derives a random key code sequence from the generated passphrase sequence;

generating, by the server computer, an encrypted file by encrypting the file with the derived random key code sequence;

associating the encrypted file with the derived random key code sequence;

storing the encrypted file and the derived random key code sequence.

16. The server computer of claim 15, wherein the virtual keyboard is displayed in a mode in which the array of elements is displayed directly as a random keyboard arrangement different than a typical keyboard arrangement.

17. The server computer of claim 15, wherein the virtual keyboard is displayed in a mode in which the array of elements is displayed as a keyboard arrangement having a random mapping between the array of elements and elements of a typical keyboard arrangement.

18. The server computer of claim 15, wherein the passphrase sequence is provided based on a physical selection of elements of the array of elements of the virtual keyboard.

19. The server computer of claim 15, wherein the passphrase sequence is provided based on a verbal selection of elements of an array of elements of the virtual keyboard.

20. The server computer of claim 15, storing additional instructions for:

receiving, by the server computer, a request for accessing the file;

retrieving, by the server computer, the encrypted file and the random key code sequence from a storage unit maintained by the server computer;

transmitting, by the server computer, the virtual keyboard to the user device and causing displaying the virtual keyboard on the user device;

receiving, by the server computer, via the virtual keyboard, an encryption passphrase sequence;

comparing the encryption passphrase sequence with the random key code sequence;

in response to determining that the encryption passphrase sequence matches the random key code sequence, transmitting, by the server computer, the encrypted file to the user device;

in response to determining that the encryption passphrase sequence does not match the random key code sequence, transmitting by the server computer an error message to the user device.

* * * * *